O. RODHE.
GAS ANALYZING APPARATUS.
APPLICATION FILED JAN. 26, 1920.
1,380,160.
Patented May 31, 1921.
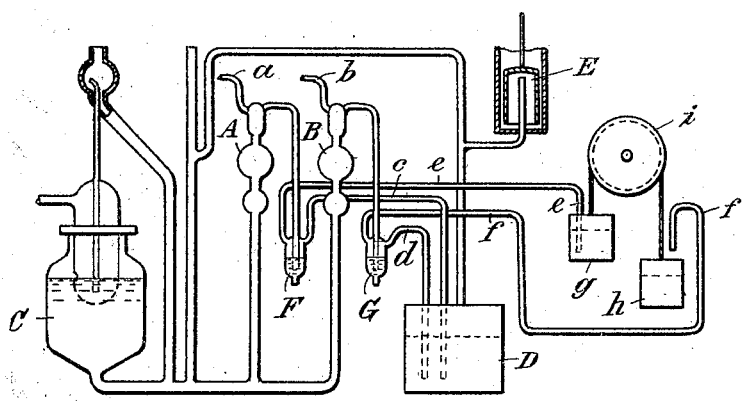
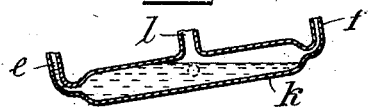
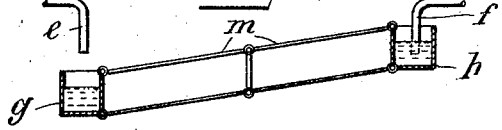
Inventor
Olof Rodhe
By Knight Bro.
Attys

UNITED STATES PATENT OFFICE.

OLOF RODHE, OF STOCKHOLM, SWEDEN, ASSIGNOR TO SVENSKA AKTIEBOLAGET MONO, OF STOCKHOLM, SWEDEN, A CORPORATION.

GAS-ANALYZING APPARATUS.

1,380,160.  Specification of Letters Patent.  Patented May 31, 1921.

Application filed January 26, 1920. Serial No. 354,282.

*To all whom it may concern:*

Be it known that I, OLOF RODHE, chief engineer, subject of the King of Sweden, residing at Odengatan 54A, Stockholm, Sweden, have invented certain new and useful Improvements in Gas-Analyzing Apparatus, of which the following is a specification.

In the use of gas analyzing apparatus it is often desired so to combine two or more apparatus that one or more of the members thereof will be common, in order to facilitate the making of alternate analyses with one and the same apparatus. By this arrangement, the analyses become synchronous, and the apparatus, only one being required for making various analyses is rendered more easily manageable and cheaper than heretofore.

The present invention has for its purpose to render the making of such alternate analyses possible, and to this end the invention is characterized by the provision of a primary measuring vessel for each different analysis, only one of said measuring vessels being connected with the other members of the apparatus, while the gas from the remaining measuring vessels flows past these members, for instance into the atmosphere. These connections are effected alternately by means of suitable valve members such as oscillating receptacles, or other reversing members such as cocks or the like.

In the accompanying drawing, Figure 1 diagrammatically illustrates an embodiment of the invention by way of example. Figs. 2 and 3 show modifications of a detail in Fig. 1.

In Fig. 1, A and B denote the two primary measuring vessels of the apparatus, various gas mixtures being sucked into the said vessels through pipes $a$ and $b$ respectively. C designates a pump adapted to operate the apparatus, D is the absorption vessel and E the secondary measuring vessel.

The apparatus operates as set forth in the patent No. 947533, the same, however, being provided with two primary measuring vessels.

Branched off from the liquid seals F and G are not only the ordinary pipes $c$ and $d$ leading into the absorption vessel D, but also pipes $e$ and $f$ leading into two receptacles $g$ and $h$, partly filled with a liquid and depending from a pivotally mounted wheel $i$. The ends of the pipes $e$ and $f$ are so arranged that on alternately turning the wheel $i$ to and fro, the mouth of the one or the other pipe is set free.

The said wheel is so connected with the apparatus that it will be turned around alternately in the one or the other direction, as the liquid in A and B falls because of the action of the pump C.

The manner of operation will be understood from the facts set forth. As on each other stroke of the pump, the mouth of pipe $e$, and on each other stroke, the mouth of pipe $f$ is sealed, each other analysis will be effected with respect to the gas sucked into the vessel B and each other analysis with respect to the gas sucked into the vessel A, whereas alternately the gas mixture in vessel A and in vessel B has free passage into the atmosphere.

Evidently, the action of the liquid seals in $g$ and $h$ must be stronger than the action of the liquid seals formed around the mouths of pipes $c$ and $d$ in the vessel D.

Fig. 2 illustrates an embodiment of the oscillating device.

$k$ denotes a pipe which is pivotally mounted in the same way and by the same means as the wheel $i$ in Fig. 1. The leads $e$ and $f$ are rigidly connected with the pipe $k$ in such a way that the latter will be free to oscillate, for instance by the arrangement of flexible tubes between the leads and the pipe. Leading to the atmosphere from the middle of pipe $k$ is a pipe $l$. Pipe $k$ is half-filled with a suitable liquid, for instance mercury.

In the position shown in the drawing, pipe $f$ is in communication with the atmosphere through pipe $l$, whereas pipe $e$ is sealed. Thus the gas mixture passes from the measuring vessel A into the absorption vessel D.

In the embodiment according to Fig. 3, the receptacles $g$ and $h$ of Fig. 1 are attached to the beam of a balance $m$.

What I claim as new and desire to secure by Letters Patent of the United States is:—

1. A gas analyzing apparatus provided with two or more primary measuring vessels, said vessels being arranged so that alternately the gas from one of these measuring vessels passes through the remaining members of the apparatus, while the gas from the remaining vessel or vessels flows past these members.

2. Gas analyzing apparatus provided with two or more primary measuring vessels and an absorption vessel, a pair of pipes leading from each of the primary measuring vessels, one pipe of each pair leading to the absorption vessel, and the other pipe of each pair leading to a reversing device, said reversing device comprising means for successively sealing one of the said pipes leading thereto.

In testimony whereof I affix my signature in presence of two witnesses.

OLOF RODHE.

Witnesses:
P. H. BERGROTH,
H. LEIHEL.